US011820292B2

(12) United States Patent
Ruff et al.

(10) Patent No.: US 11,820,292 B2
(45) Date of Patent: Nov. 21, 2023

(54) TRUCK CRANE ADAPTER ASSEMBLY FOR A GOOSENECK HITCH

(71) Applicant: Mod.al, Draper, UT (US)

(72) Inventors: Preston Ruff, Draper, UT (US); Kreg Peeler, Draper, UT (US)

(73) Assignee: Mod.al Group, Inc., American Fork, UT (US)

( * ) Notice: Subject to any disclaimer, the term of this patent is extended or adjusted under 35 U.S.C. 154(b) by 18 days.

(21) Appl. No.: 17/406,992

(22) Filed: Aug. 19, 2021

(65) Prior Publication Data

US 2023/0054557 A1    Feb. 23, 2023

(51) Int. Cl.
*B60R 11/00* (2006.01)
*B66C 23/44* (2006.01)
*B60D 1/52* (2006.01)

(52) U.S. Cl.
CPC ............ *B60R 11/00* (2013.01); *B60D 1/52* (2013.01); *B60R 2011/004* (2013.01); *B60R 2011/005* (2013.01); *B60R 2011/0066* (2013.01); *B66C 23/44* (2013.01)

(58) Field of Classification Search
CPC ............ B60R 11/00; B60R 2011/004; B60R 2011/005; B60R 2011/0066; B66C 23/44; B60D 1/52; B60D 1/485; B60D 1/488; B60D 1/249
USPC .... 248/646, 221.11, 221.12, 223.31, 223.41, 248/224.7, 224.8, 288.11, 288.31, 295.11, 248/297.21, 297.31; 414/543; 280/483
See application file for complete search history.

(56) References Cited

U.S. PATENT DOCUMENTS

| | | | | |
|---|---|---|---|---|
| 4,050,714 A | * | 9/1977 | Epp | B60D 1/06 280/495 |
| 4,576,395 A | * | 3/1986 | Longoria | B60R 9/06 224/520 |
| 4,806,063 A | * | 2/1989 | York | A22B 5/06 452/187 |
| 5,281,078 A | * | 1/1994 | Mills, Jr. | B66C 23/44 414/563 |
| 5,445,281 A | * | 8/1995 | Hung | B66C 23/44 212/253 |
| 5,752,799 A | * | 5/1998 | Carey | B60P 1/5471 224/403 |
| 5,988,667 A | * | 11/1999 | Young | B60D 1/241 280/506 |
| 6,089,431 A | * | 7/2000 | Heyworth | B60D 1/075 224/521 |
| 6,095,545 A | * | 8/2000 | Bol, II | B60D 1/54 280/491.1 |
| 6,138,991 A | * | 10/2000 | Myers, Jr. | B66C 23/44 212/180 |
| 6,499,610 B2 | * | 12/2002 | Spitsbergen | B66C 23/44 212/270 |
| 6,776,431 B1 | * | 8/2004 | Dick | B62D 53/0828 280/425.2 |

(Continued)

*Primary Examiner* — Christopher Garft
*Assistant Examiner* — Michael McDuffie
(74) *Attorney, Agent, or Firm* — Kirton McConkie; Brian Tucker

(57) ABSTRACT

A truck crane adapter can be used to selectively secure a variety of truck cranes to a gooseneck hitch of a pickup truck. The truck crane adapter can also be configured to prevent or minimize damage to the bed of a pickup truck even when the truck crane is used to lift heavy loads.

15 Claims, 6 Drawing Sheets

(56) References Cited

U.S. PATENT DOCUMENTS

| | | | | |
|---|---|---|---|---|
| 6,981,834 | B1* | 1/2006 | Henry | B60P 1/5471 |
| | | | | 212/299 |
| 7,097,193 | B1* | 8/2006 | Sievert | B60D 1/42 |
| | | | | 280/479.2 |
| 7,152,870 | B2* | 12/2006 | Gurtler | B62D 53/061 |
| | | | | 280/483 |
| 8,079,611 | B2* | 12/2011 | Schroeder | B60D 1/54 |
| | | | | 280/472 |
| 8,556,287 | B1* | 10/2013 | Connell | B62D 53/08 |
| | | | | 280/495 |
| 9,254,988 | B1* | 2/2016 | Caspersen | B66C 23/44 |
| 9,327,947 | B2* | 5/2016 | Davis | B66C 23/44 |
| 9,333,822 | B1* | 5/2016 | LaFave | B60R 9/06 |
| 9,388,024 | B1* | 7/2016 | McCully | B66C 23/46 |
| 9,744,386 | B2* | 8/2017 | Baughman | A62B 35/0068 |
| 10,123,527 | B1* | 11/2018 | Leger, Sr. | B66D 3/26 |
| 10,155,423 | B1* | 12/2018 | Gebheim | B60D 1/52 |
| 10,486,479 | B2* | 11/2019 | Pulliam | B60D 1/58 |
| 10,857,846 | B1* | 12/2020 | Jacobs | B60D 1/06 |
| 11,072,214 | B2* | 7/2021 | McCoy | B60D 1/075 |
| 11,407,265 | B2* | 8/2022 | Townsend, IV | B60D 1/66 |
| 11,458,786 | B2* | 10/2022 | Schieber | B60D 1/54 |
| 2006/0045704 | A1* | 3/2006 | Laufenberg | B60P 1/548 |
| | | | | 414/543 |
| 2006/0120842 | A1* | 6/2006 | Thompson | B66C 23/44 |
| | | | | 414/462 |
| 2007/0170328 | A1* | 7/2007 | Fortes | F16M 13/02 |
| | | | | 248/288.31 |

* cited by examiner

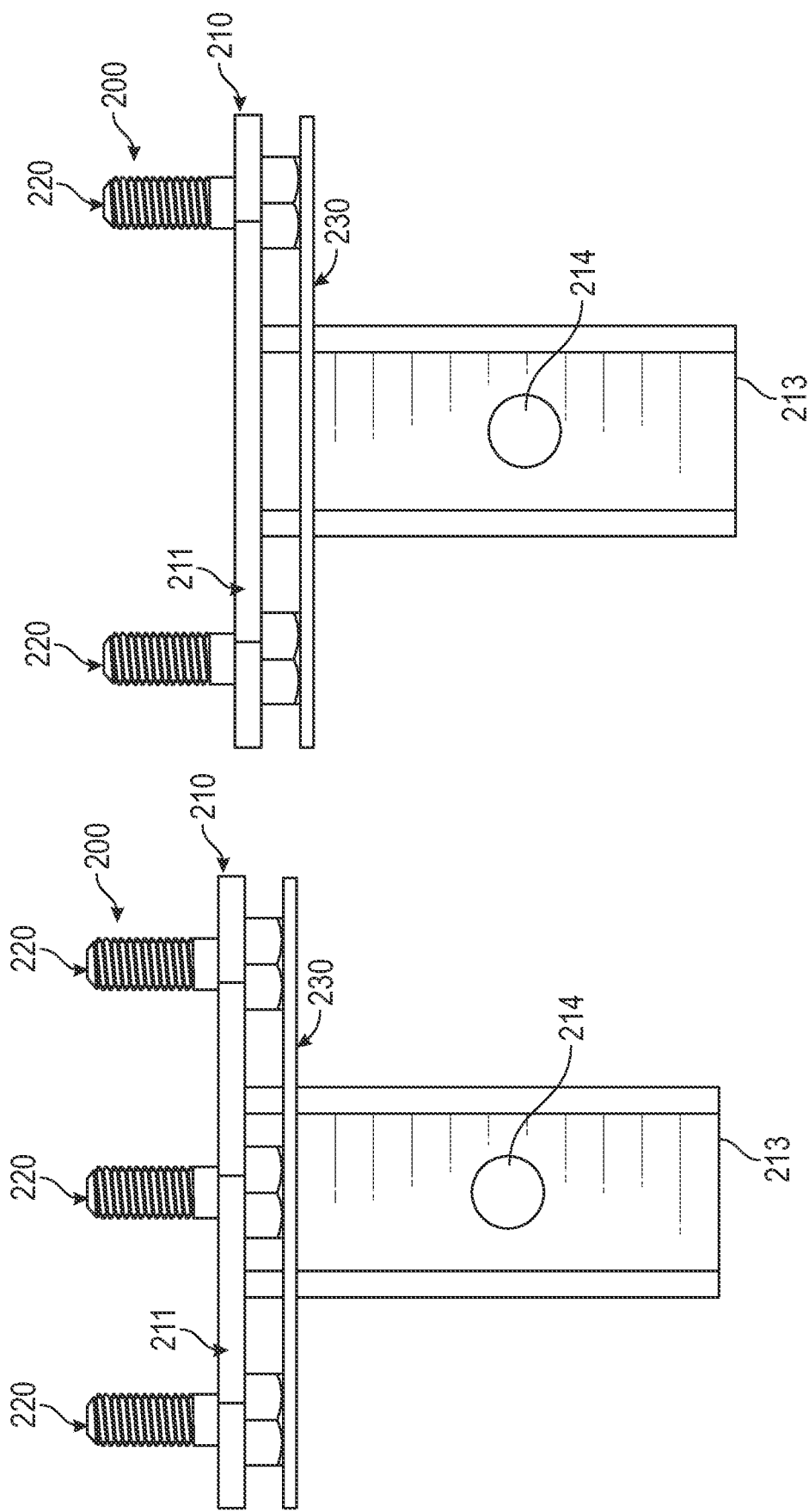

TRUCK CRANE ADAPTER ASSEMBLY FOR A GOOSENECK HITCH

CROSS-REFERENCE TO RELATED APPLICATIONS

N/A

BACKGROUND

For purposes of this specification and the claims, a "truck crane" can be construed as a crane that is positioned in the bed of a pickup truck. Oftentimes, truck cranes are permanently installed in the bed of the pickup truck such as by bolting them to the pickup truck's chassis. Such installations usually require substantial structural modifications. Also, when a truck crane is removed, it will typically leave behind lasting damage.

BRIEF SUMMARY

The present invention extends to a truck crane adapter assembly for a gooseneck hitch. The truck crane adapter assembly can be used to selectively secure a variety of truck cranes to a gooseneck hitch of a pickup truck. The truck crane adapter assembly can also be configured to prevent or minimize damage to the bed of a pickup truck even when the truck crane is used to lift heavy loads.

In some embodiments, the present invention may be implemented as a truck crane adapter assembly that includes a truck crane adapter having an adapter plate that is configured to be secured to a mounting plate of a truck crane and a shank that is configured to couple to a gooseneck hitch.

In some embodiments, the adapter plate includes a plurality of holes that correspond with mounting holes in the mounting plate. In some embodiments, each of the plurality of holes is elongated. In some embodiments, the plurality of holes comprise at least four holes.

In some embodiments, the truck crane adapter assembly may also include a plurality of fasteners that insert upwardly through the plurality of holes in the adapter plate to secure the adapter plate to the mounting plate. In some embodiments, the fasteners are bolts.

In some embodiments, the shank is configured to insert into a receiver of the gooseneck hitch. In some embodiments, the shank includes holes that are configured to receive a hitch pin when the shank is inserted into the receiver of the gooseneck hitch. In some embodiments, the holes in the shank are positioned on each side of the shank.

In some embodiments, the truck crane adapter assembly may also include a bed protection plate. In some embodiments, the bed protection plate includes an opening through which the shank extends.

In some embodiments, the truck crane adapter assembly may include a plurality of bolts that extend upwardly through the adapter plate, and the bed protection plate may be positioned below the plurality of bolts. In some embodiments, heads of the plurality of bolts are sandwiched between the adapter plate and the bed protection plate when the shank is coupled to the gooseneck hitch.

In some embodiments, the present invention may be implemented as a truck crane adapter assembly that comprises a truck crane adapter including an adapter plate and a shank. The adapter plate may be configured to couple to a mounting plate of a truck crane. The shank may be configured to insert into a receiver of a gooseneck hitch. The truck crane adapter assembly may also include a bed protection plate.

In some embodiments, the truck crane adapter assembly may also include a plurality of bolts that extend upwardly through the adapter plate to couple the adapter plate to the mounting plate, and the bed protection plate is positioned below the plurality of bolts.

In some embodiments, the bed protection plate includes an opening through which the shank extends.

In some embodiments, the shank includes holes that are configured to receive a hitch pin when the shank is inserted into the receiver of the gooseneck hitch.

In some embodiments, the present invention may be implemented as a truck crane adapter assembly that comprises a truck crane adapter that includes an adapter plate having a plurality of holes and a shank that extends downwardly from the adapter plate. The truck crane adapter assembly may also include a plurality of fasteners that extend upwardly through the plurality of holes in the adapter plate to couple the adapter plate to a mounting plate of a truck crane.

In some embodiments, the truck crane adapter assembly may also include a bed protection plate positioned below the plurality of fasteners.

In some embodiments, the shank is configured to insert into a receiver of a gooseneck hitch.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 2E is a side view of the truck crane adapter assembly of FIG. 2A;

FIG. 2F is a front/rear view of the truck crane adapter assembly of FIG. 2A;

DETAILED DESCRIPTION

Figure 1:
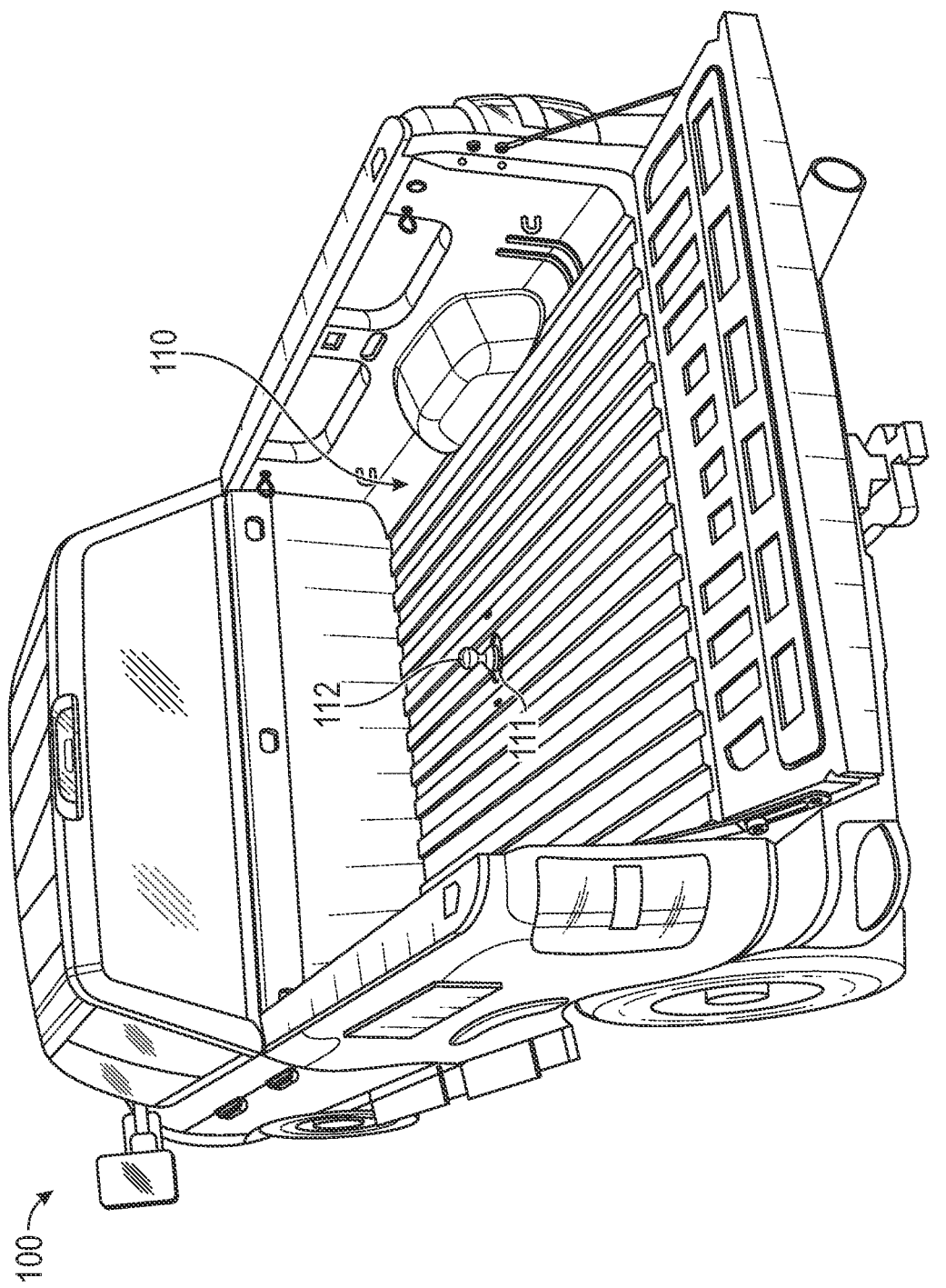
FIG. 1 illustrates a pickup truck that has a gooseneck hitch with a turnover ball.
Figure 2B:
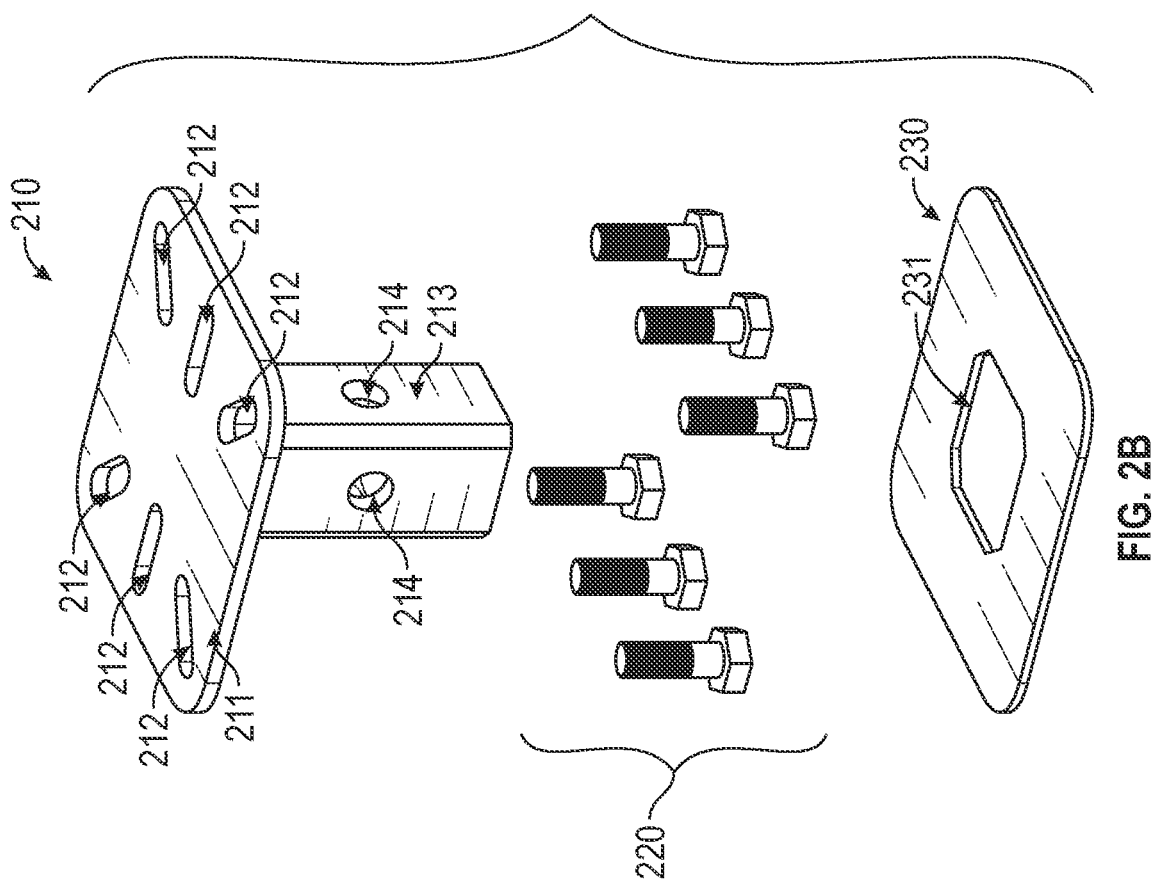
FIG. 2B is an exploded side perspective view of the truck crane adapter assembly of FIG. 2A.
Figure 2A:
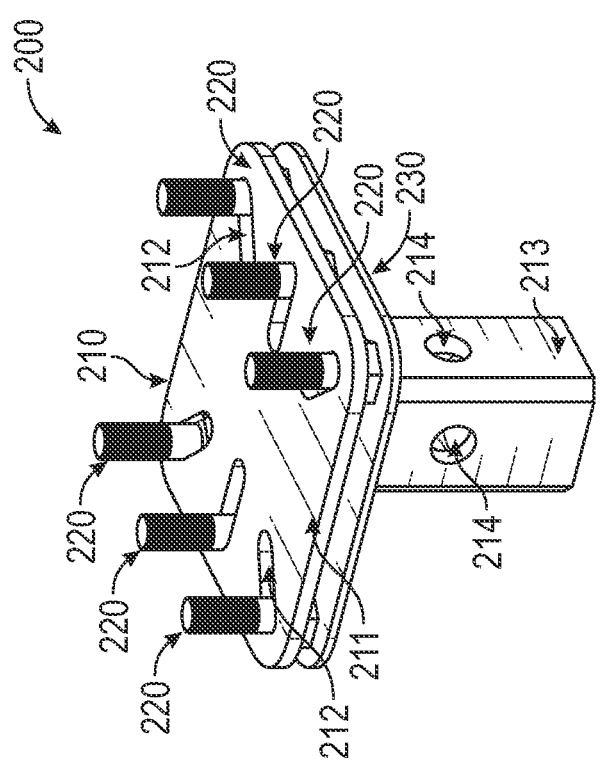
FIG. 2A is a front perspective view of a truck crane adapter assembly that is configured in accordance with one or more embodiments of the present invention.
Figure 2C:
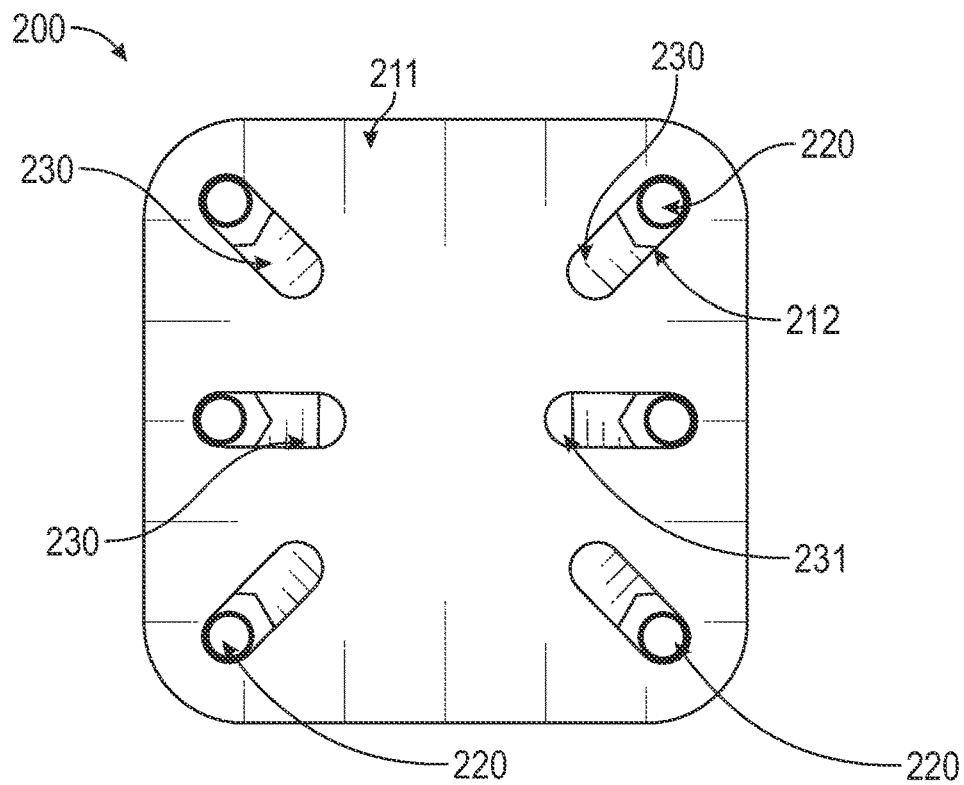
FIG. 2C is a top view of the truck crane adapter assembly of FIG. 2A.
Figure 2D:
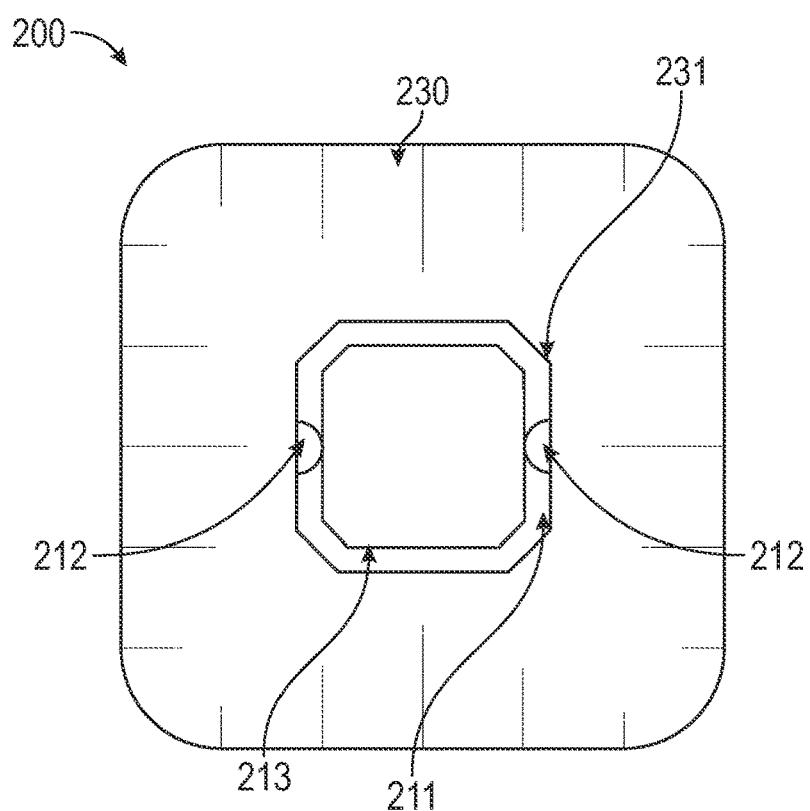
FIG. 2D is a bottom view of the truck crane adapter assembly of FIG. 2A.

FIG. 1 illustrates a pickup truck 100 having a bed 110 in which a gooseneck hitch 111 has been installed. Gooseneck hitch 111 is commonly installed as an aftermarket component but may be an accessory installed by the pickup truck manufacturer. In FIG. 1, a turnover ball 112 is inserted into gooseneck hitch 111 but may be removed. In accordance with embodiments of the present invention, a truck crane adapter assembly can be used to enable a truck crane to be secured in bed 110 via gooseneck hitch 111.

FIGS. 2A-2F are different views of a truck crane adapter assembly 200 that is configured in accordance with one or more embodiments of the present invention. Truck crane adapter assembly 200 includes a truck crane adapter 210, bolts 220 and a bed protection plate 230.

Truck crane adapter 210 includes an adapter plate 211 from which a shank 213 extends. The top surface of adapter plate 211 may be substantially flat so that it may be positioned flush against the bottom side of a mounting plate of a truck crane. Adapter plate 211 may include a number of holes 212 that extend through adapter plate 211 and that may be positioned to correspond with mounting holes in the mounting plate of a truck crane. In some embodiments, holes 212 may be elongated to conform to a variety of hole positions and/or patterns that may be used on the mounting plates of different truck cranes. For example, four holes may be positioned in each corner of adapter plate 211 and may extend towards a center point of adapter plate 211 to accommodate holes in the corners of different-sized mounting plates. Similarly, two holes 212, which may also be elongated, may be positioned at the center point of opposing sides of adapter plate 211 to accommodate mounting plates having six mounting holes.

Shank 213 may be shaped and sized to correspond with the shape and size of the receiver of a gooseneck hitch. For example, a gooseneck hitch may have a 2.5-inch square receiver that uses a turnover ball. In such cases, shank 213 may be substantially square and approximately 2.5 inches wide and 4 inches long to enable it to be inserted in the gooseneck hitch when the turnover ball is removed. However, shank 213 could have any suitable shape and size to enable it to be used with other shaped and/or sized gooseneck hitch receivers.

Shank 213 may also include holes 214 that are sized and positioned to correspond with the size and position of hitch pin holes in the gooseneck hitch receiver. For example, each hole 214 may be centered within the respective side of shank 213 and, assuming the hitch pin holes are positioned 2 inches from the receiver opening, each hole 214 may be positioned more than 2 inches below adapter plate 211 to account for the thickness of the heads of bolts 220 and the thickness of bed protection plate 230 as described below. In some embodiments, a hole 214 may be formed in each side of shank 213 to enable shank 213 to be inserted into the gooseneck hitch receiver in any orientation.

Bolts 220 can be configured to insert upwardly through holes 212 such that their heads will be positioned below adapter plate 211. Bolts 220 can be sized to insert through the mounting holes in the mounting plate of a truck crane. Nuts (not shown) can then be tightened onto bolts 220 to secure truck crane adapter 210 to the mounting plate of the truck crane. Other types of fasteners, such as screws, may be used in place of bolts 220 if appropriate for a particular mounting plate. Also, in some embodiments, adapter plate 210 could be secured to the mounting plate via welding or another suitable technique. Regardless of how adapter plate 211 may be secured to the mounting plate of a truck crane, once adapter plate 211 is secured, shank 213 will be oriented downwardly away from the mounting plate.

Bed protection plate 230 can have an opening 231 for receiving shank 213. When a truck crane to which truck crane adapter 210 has been secured is to be inserted into a gooseneck hitch receiver, bed protection plate 230 can be placed over the gooseneck hitch receiver and then shank 213 can be inserted through opening 231 and into the gooseneck hitch receiver. Bed protection plate 230 can be shaped and sized to ensure that the heads of bolts 220 will be positioned on top of bed protection plate 230 to thereby prevent damage to the bed of the pickup truck. In some embodiments, bed protection plate 230 and adapter plate 211 may have the same size and shape.

Figure 3A:
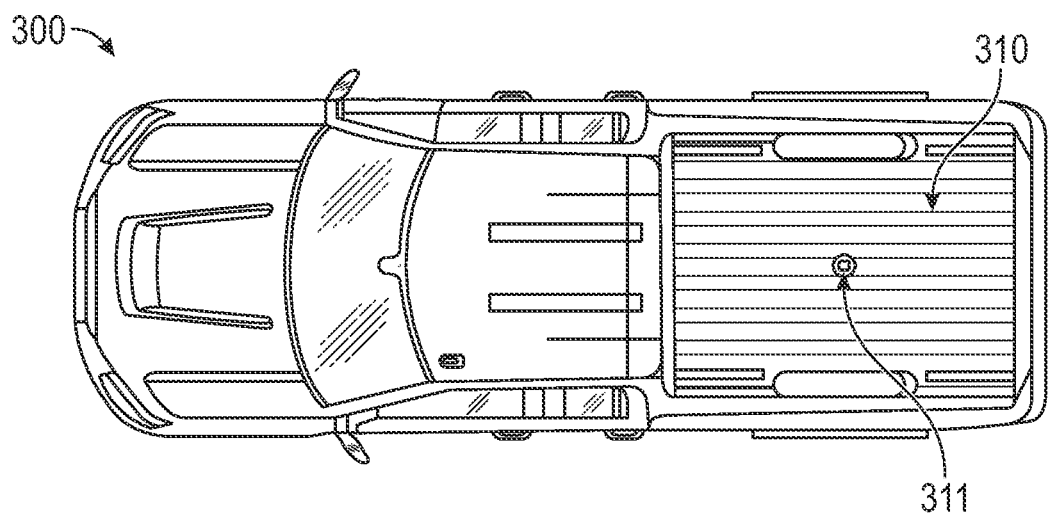
FIG. 3A is a top view of a pickup truck that has a gooseneck hitch.
Figure 3B:
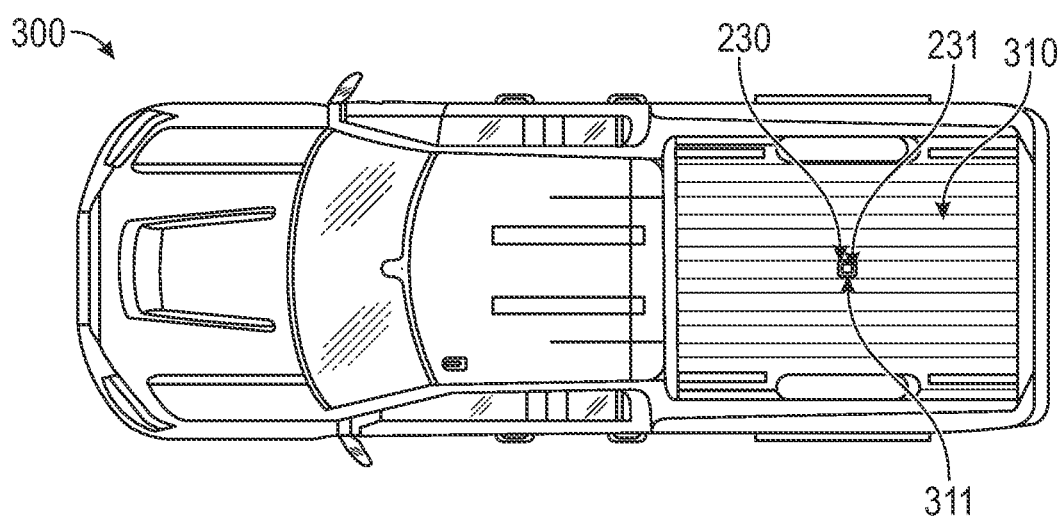
FIG. 3B shows a bed protection plate of the truck crane adapter assembly positioned over the gooseneck hitch of the pickup truck in FIG. 3A.
Figure 4:
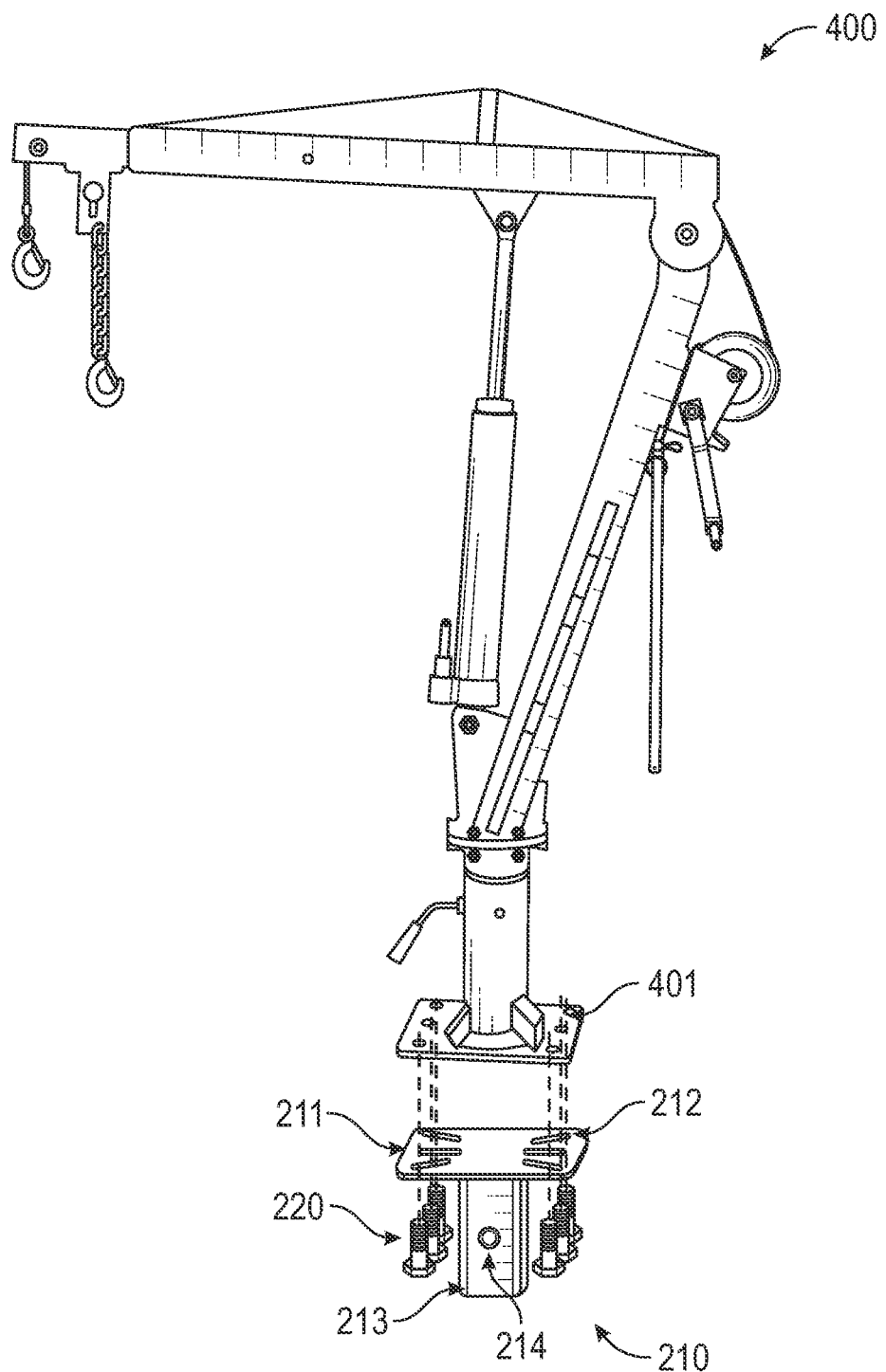
FIG. 4 illustrates how a truck crane adapter of the truck crane adapter assembly of FIG. 2A can be installed on the mounting plate of a truck crane.

FIGS. 3A, 3B and 4 provide an example of how truck crane adapter assembly 200 may be used with a truck 300 and a truck crane 400. As shown in FIG. 3A, truck 300 includes a bed 310 having a gooseneck hitch receiver 311. As shown in FIG. 4, a truck crane 400 has a mounting plate 401 with six mounting holes. In this example, truck crane adapter 210 can be secured to mounting plate 401 by positioning adapter plate 211 against the bottom of mounting plate 401 and inserting six bolts 220 upwardly through holes 212 and through the mounting holes in mounting plate 401. Six nuts (not shown) could then be tightened onto bolts 220 until the heads of bolts 220 are secured tightly against the bottom side of adapter plate 211.

With reference to FIG. 3B, bed protection plate 230 can be placed in bed 310 with opening 231 aligned with gooseneck hitch receiver 311. Truck crane 400 could then be secured in bed 310 by inserting shank 213 into gooseneck hitch receiver 311 until the heads of bolts 220 are positioned on bed protection plate 230 and then inserting a hitch pin through holes 214 and through hitch pin holes in gooseneck hitch receiver 311. With bed protection plate 230 positioned around shank 213, the heads of bolts 220 will rest on bed protection plate 230 to thereby protect bed 310 from damage.

In summary, truck crane adapter assembly 200 can enable a variety of truck cranes to be selectively used on any pickup truck having a gooseneck hitch receiver. Truck crane adapter assembly 200 is a compact and removable truck crane mounting solution that eliminates the need for invasive and damaging permanent installations.

A truck crane adapter assembly configured in accordance with embodiments of the present invention may also be used to enable other tools or components to be selectively secured in the bed of a pickup truck via a gooseneck hitch. For example, truck crane adapter 210 could be configured to be secured to a motorcycle/ATV mount, generator bracket, fuel tank, toolbox, etc.

The described embodiments are to be considered in all respects only as illustrative and not restrictive. The scope of the invention is, therefore, indicated by the appended claims rather than by the foregoing description.

What is claimed:
1. A truck crane adapter assembly comprising:
   a truck crane adapter having an adapter plate that is configured to be secured to a mounting plate of a truck crane and a shank that extends from the adapter plate and is configured to insert into a receiver of a gooseneck hitch on a truck, wherein the adapter plate extends along a plane and the shank is perpendicular to the plane; and
   a bed protection plate that includes an opening through which the shank extends such that the bed protection plate rests on a bed of the truck around the gooseneck hitch and protects the bed from the adapter plate.

2. The truck crane adapter assembly of claim 1, wherein the adapter plate includes a plurality of holes that correspond with mounting holes in the mounting plate.

3. The truck crane adapter assembly of claim 2, wherein each of the plurality of holes is elongated.

4. The truck crane adapter assembly of claim 2, wherein the plurality of holes comprise at least four holes.

5. The truck crane adapter assembly of claim 2, further comprising:
a plurality of fasteners that insert upwardly through the plurality of holes in the adapter plate to secure the adapter plate to the mounting plate.

6. The truck crane adapter assembly of claim 5, wherein the fasteners are bolts.

7. The truck crane adapter assembly of claim 1, wherein the shank includes holes that are configured to receive a hitch pin when the shank is inserted into the receiver of the gooseneck hitch.

8. The truck crane adapter assembly of claim 7, wherein the holes in the shank are positioned on each side of the shank.

9. The truck crane adapter assembly of claim 1, further comprising:
a plurality of bolts that extend upwardly through the adapter plate, the bed protection plate being positioned below the plurality of bolts.

10. The truck crane adapter assembly of claim 9, wherein heads of the plurality of bolts are sandwiched between the adapter plate and the bed protection plate when the shank is inserted into the receiver of the gooseneck hitch.

11. A truck crane adapter assembly comprising:
a truck crane adapter including an adapter plate and a shank, the adapter plate being configured to couple to a mounting plate of a truck crane, the shank being configured to insert into a receiver of a gooseneck hitch on a truck; and
a bed protection plate that surrounds the receiver and is positioned under the adapter plate when the shank is inserted into the receiver to thereby protect a bed of the truck around the gooseneck hitch.

12. The truck crane adapter assembly of claim 11, further comprising:
a plurality of bolts that extend upwardly through the adapter plate to couple the adapter plate to the mounting plate, the bed protection plate being positioned below the plurality of bolts.

13. The truck crane adapter assembly of claim 12, wherein the bed protection plate includes an opening through which the shank extends.

14. The truck crane adapter assembly of claim 13, wherein the shank includes holes that are configured to receive a hitch pin when the shank is inserted into the receiver of the gooseneck hitch.

15. A truck crane adapter assembly comprising:
a truck crane adapter comprising:
an adapter plate having a plurality of holes, the adapter plate extending along a plane; and
a shank that extends downwardly and perpendicularly from the adapter plate, the shank being configured to insert into a receiver of a gooseneck hitch on a truck;
a plurality of fasteners that extend upwardly through the plurality of holes in the adapter plate to couple the adapter plate to a mounting plate of a truck crane; and
a bed protection plate positioned below the plurality of fasteners such that the bed protection plate rests on a bed of the truck around the gooseneck hitch and protects the bed from the adapter plate and the plurality of fasteners.

* * * * *